US012328343B2

(12) United States Patent
Attanasio et al.

(10) Patent No.: US 12,328,343 B2
(45) Date of Patent: Jun. 10, 2025

(54) MANAGING LAWFUL INTERCEPTION INFORMATION

(71) Applicant: Telefonaktiebolaget LM Ericsson (PUBL), Stockholm (SE)

(72) Inventors: Francesco Attanasio, Roccapiemonte (IT); Amedeo Imbimbo, Caivano (IT)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 335 days.

(21) Appl. No.: 17/782,299

(22) PCT Filed: Dec. 16, 2019

(86) PCT No.: PCT/SE2019/051286
§ 371 (c)(1),
(2) Date: Jun. 3, 2022

(87) PCT Pub. No.: WO2021/126020
PCT Pub. Date: Jun. 24, 2021

(65) Prior Publication Data
US 2023/0007052 A1 Jan. 5, 2023

(51) Int. Cl.
*H04L 9/40* (2022.01)
*H04M 3/22* (2006.01)
(Continued)

(52) U.S. Cl.
CPC ........... *H04L 63/306* (2013.01); *H04W 12/80* (2021.01)

(58) Field of Classification Search
CPC ...... H04L 63/306; H04L 63/30; H04W 12/80; H04W 12/02; H04M 3/42008; H04M 2207/185; H04M 3/2281
See application file for complete search history.

(56) References Cited

U.S. PATENT DOCUMENTS 8,191,153 B2 * 5/2012 Zembutsu ........... H04L 63/0892
726/4
8,364,723 B1 * 1/2013 Hseush ................. G06F 16/283
707/758
(Continued)

FOREIGN PATENT DOCUMENTS

EP    2 023 564 A1    2/2009
EP    1 299 974 B1    9/2010
(Continued)

OTHER PUBLICATIONS

3GPP TS 23.214 v15.5.0; Technical Specification; 3rd Generation Partnership Project; Technical Specification Group Services and System Aspects; Architecture enhancements for control and user plane separation of EPC nodes; Stage 2 (Release 15)—Dec. 2018.
(Continued)

*Primary Examiner* — Harry H Kim
(74) *Attorney, Agent, or Firm* — Baker Botts L.L.P.

(57) ABSTRACT

A determination is made that an identity of a non-target communicating entity (102) with which a target communicating entity (101) is communicating, is to be obfuscated in any report of lawful interception of the target communicating entity (101) to a law enforcement agency (131). Lawful interception is performed of the target communicating entity (101) and information pertaining to the lawful interception of the target communicating entity (101) is reported to the law enforcement agency (131). The reported information comprises non-obfuscated identity information of the target communicating entity (101) and obfuscated identity information of the non-target communicating entity (102).

9 Claims, 6 Drawing Sheets

(51) Int. Cl.
*H04M 3/42* (2006.01)
*H04W 12/02* (2009.01)
*H04W 12/80* (2021.01)

(56) References Cited

U.S. PATENT DOCUMENTS

| | | | | |
|---|---|---|---|---|
| 8,954,441 | B1* | 2/2015 | Baranov | G06F 16/2246 707/739 |
| 2002/0023281 | A1* | 2/2002 | Gorlach | G01N 33/56961 536/23.6 |
| 2009/0007263 | A1* | 1/2009 | Frenkel | H04M 3/2281 726/22 |
| 2012/0096145 | A1* | 4/2012 | Le | G06Q 50/265 709/224 |
| 2018/0288102 | A1* | 10/2018 | Ghosh | H04L 63/306 |

FOREIGN PATENT DOCUMENTS

| | | |
|---|---|---|
| WO | 02 062037 A2 | 8/2002 |
| WO | 2016 013964 A1 | 1/2016 |
| WO | 2019 093932 A1 | 5/2019 |

OTHER PUBLICATIONS

3GPP TR 21.905 v15.1.0; Technical Report; 3rd Generation Partnership Project; Technical Specification Group Services and System Aspects; Vocabulary for 3GPP Specifications (Release 15)—Dec. 2018.

3GPP TS 23.271 v15.1.0; Technical Specification; 3rd Generation Partnership Project; Technical Specification Group Services and System Aspects; Functional stage 2 description of Location Services (LCS) (Release 15)—Sep. 2018.

3GPP TS 23.501 v15.7.0; Technical Specification; 3rd Generation Partnership Project; Technical Specification Group Services and System Aspects; System Architecture for the 5G System (5GS); Stage 2 (Release 15)—Sep. 2019.

3GPP TS 23.502 v15.7.0; Technical Specification; 3rd Generation Partnership Project; Technical Specification Group Services and System Aspects; Procedures for the 5G System (5GS); Stage 2 (Release 15)—Sep. 2019.

3GPP TS 33.107 v15.6.0; Technical Specification; 3rd Generation Partnership Project; Technical Specification Group Services and System Aspects; 3G security; Lawful interception architecture and functions (Release 15)—Jun. 2019.

3GPP TS 33.126 v15.1.0; Technical Specification; 3rd Generation Partnership Project; Technical Specification Group Services and System Aspects; Security; Lawful Interception requirements (Release 15)—Dec. 2018.

3GPP TS 33.127 v15.2.0; Technical Specification; 3rd Generation Partnership Project; Technical Specification Group Services and System Aspects; Security; Lawful Interception (LI) architecture and functions (Release 15)—Jun. 2019.

3GPP TS 33.128 v15.2.0; Technical Specification; 3rd Generation Partnership Project; Technical Specification Group Services and System Aspects; Security; Protocol and Procedures for Lawful Interception (LI); Stage 3 (Release 15)—Sep. 2019.

3GPP TS 33.501 v15.6.0; Technical Specification; 3rd Generation Partnership Project; Technical Specification Group Services and System Aspects; Security architecture and procedures for 5G system (Release 15)—Sep. 2019.

Madhusanka Liyanage et al., A Comprehensive Guide to 5G Security, First Edition published by John Wiley & Sons Ltd—2018.

ETSI GR NFV-SEC 011 v1.1.1; Group Report; Network Functions Virtualisation (NFV); Security; Report on NFV LI Architecture—Apr. 2018.

ETSI TS 103 120 v1.3.1; Technical Specification; Lawful Interception (LI); Interface for warrant information—May 2019.

ETSI TS 103 221-1 v1.1.1; Technical Specification; Lawful Interception (LI); Part 1: Internal Network Interface X1 for Lawful Interception—Oct. 2017.

ETSI TS 133 107 v15.6.0; Technical Specification; Universal Mobile Telecommunications System (UMTS); LTE; Digital cellular telecommunications system (Phase 2+) (GSM); 3G security; Lawful interception architecture and functions (3GPP TS 33.107 version 15.6.0 Release 15)—Jul. 2019.

Mobile Location Protocol 3.3, Candidate Version 3.3; OMA Open Mobile Alliance—Oct. 1, 2009.

PCT Notification of Transmittal of the International Search Report and the Written Opinion of the International Searching Authority, or the Declaration issued for International application No. PCT/SE2019/051286—Nov. 24, 2020.

Extended European Search Report issued for Application No./ Patent No. 19956402.2-1213 / 4079015 1 PCT/SE2019051286—Nov. 9, 2022.

* cited by examiner

MANAGING LAWFUL INTERCEPTION INFORMATION

PRIORITY

This nonprovisional application is a U.S. National Stage Filing under 35 U.S.C. § 371 of International Patent Application Serial No. PCT/SE2019/051286 filed Dec. 16, 2019 and entitled "MANAGING LAWFUL INTERCEPTION INFORMATION" which is hereby incorporated by reference in its entirety.

TECHNICAL FIELD

Embodiments herein relate to a method of managing lawful interception (LI) information in a telecommunication network, a corresponding computer system as well as computer programs and carriers of such computer programs.

BACKGROUND

Communication service providers in the so-called $5^{th}$ generation (5G) digital communication network scenario are not restricted to traditional telecommunication operators, but include many other providers taking advantage of the inherent versatility, capacity and speed of the systems and networks.

As a consequence of this evolution, issues related to personal information and privacy have multiplied many times since the advent of the earliest digital telecommunication networks such as the global system for mobile communications (GSM).

Privacy in general deals with the protection of personal information which may reveal or may lead to hinting any details of personal information/activities regarding a specific user. If such information is not secured well enough, it might be used by any intruder to notice their daily activities and eventually can be utilized to harm them through various means.

Privacy in 5G networks will be crucial because it will bring huge transformation in terms of new daily life applications and access modes of digital services. Also, 5G will bring new enhancements in terms of architectural and service-oriented requirements as compared to traditional mobile networks (3G, 4G), so it will require strong privacy policies and regulations. 5G privacy will be vital for whole eco-systems including users and various other stakeholders. Therefore, to have complete public acceptance and adoption of the 5G network, it is mandatory that privacy issues are well addressed. User privacy of 5G mobile network can be divided into three main categories: data, location and identity privacy.

Data privacy represents the confidentiality and privacy of stored data. As the advancement towards 5G mobile networks is rapid and concrete, consumers will be giving more preference to mobile networks as compared with traditional internet-based services.

Consequently, 5G mobile networks are expected to have high data speed and low latency, which eventually result into huge volume of data. For example, lawful interception generates sensitive user data and thus require data protections while storing and utilizing that data.

Location Privacy: With the advent of 5G technology, location based services (LBS) are getting more important as users can access useful services based on knowing the location information. Also, nowadays, several LI features possess the capabilities of monitoring, based on location-based services. However, along with such kind of services, users would be continuously tracked by various actors through their personal gadgets or devices embedded in the environment and that could cause serious concerns to user's privacy.

Identity privacy refers to protecting the identity information of the subscriber and the device/user equipment (UE). With 5G and internet-of-things (IoT), it is expected that billions of devices will be connected to the internet. In such digitalization, every entity (user or device) would be categorized by some identity to access or deliver required services. Using identities, services and personal information can be accessed. Thus, it is important to have secure and efficient identity management mechanism in 5G networks.

Furthermore, the integration of new technologies such as software defined network (SDN), network function virtualization (NFV) and cloud computing concepts into 5G networks will open numerous new privacy challenges. In 5G, various heterogeneous service providers and operators will store and use personal data of consumers with or without their permission. There will be different stakeholders involved in the whole 5G LI eco-system for providing different services. Hence, the personal data of an increasing number of users will go through the hands of multiple actors also in an LI process, even if they are not the direct targets of interceptions, but they represent the other party of a communication.

3GPP ($3^{rd}$ Generation Partnership Project) TS 33.127 V15.2.0 discloses the LI architecture and functions in a 3GPP network.

SUMMARY

In view of the above, an object of the present disclosure is to overcome drawbacks related to user privacy in the context of LI. This object is achieved in a first aspect by a method of managing LI information in a telecommunication network.

The method of the first aspect comprises determining that an identity of a non-target communicating entity, with which a target communicating entity is communicating, is to be obfuscated in a report of LI of the target communicating entity to a law enforcement agency (LEA). For example, such a determination may comprise determining that the identity of the non-target communicating entity is to be obfuscated only in reports of IRI. Lawful interception of the target communicating entity is performed and information pertaining to the performed LI of the target communicating entity is reported to the LEA. The reported information comprises non-obfuscated identity information of the target communicating entity and obfuscated identity information of the non-target communicating entity.

That is, drawbacks of prior art are overcome in that the LEA is prevented from obtaining information about communicating entities, e.g. subscribers, that are not targets of LI and thereby protecting the privacy of these non-target communicating entities. As privacy compliance has become a prevalent business concern due to an increasing number of regulations designed to protect unauthorized access to personally identifiable information, such a method enables, e.g., a communication services provider to reduce costs related to security and cases of disputes with users that are not under lawful interception. Such advantages will be accentuated, e.g., in the context of monitoring of devices associated with the concept of internet of things (IoT). That is, methods as disclosed herein will facilitate monitoring of only specific sensitive devices, but the persons not being appointed targets of interception will be protected in their privacy.

In some embodiments, the method comprises receiving by an LI ADMF, from the LEA via an LI_HI1 interface, a LITaskObject comprising a data field configured to indicate whether or not identity information of the non-target communicating entity is to be obfuscated in a report of LI of the target communicating entity to the LEA. This data field comprises an indication that identity information of the non-target communicating entity is to be obfuscated. The LITaskObject comprises a DeliveryType data field that indicates that only IRI is to be subject of LI. A Mediation and Delivery Function 2 (MDF2) receives, from the ADMF via an LI_X1 interface, TaskDetails comprising a data field configured to indicate whether or not identity information of the non-target communicating entity is to be obfuscated, the data field comprising an indication that identity information of the non-target communicating entity is to be obfuscated. The MDF2 receives, from a POI via an LI_X2 interface, event data comprising information pertaining to the performed LI of the target communicating entity. The MDF2 then transmits, to a LEMF via an LI_HI2 interface, a report that comprises information pertaining to LI of the target communicating entity and in which report the identity information of the non-target communicating entity is obfuscated.

In some of these embodiments, the transmission of the report comprises omitting at least part of the identity information of the non-target communicating entity. Moreover, in some embodiments, the MDF2 performs hashing of at least part of the identity information of the non-target communicating entity and then the transmission of the report comprises transmitting the hashed identity information of the non-target communicating entity.

In other embodiments, the method comprises receiving by a LI ADMF from the LEA via an LI_HI1 interface, a LITaskObject comprising a data field configured to indicate whether or not identity information of the non-target communicating entity is to be obfuscated in a report of LI of the target communicating entity to the LEA. This data field comprises an indication that identity information of the non-target communicating entity is to be obfuscated. The LITaskObject comprises a DeliveryType data field that indicates that only IRI is to be subject of LI. A POI receives, from the ADMF via an LI_X1 interface, TaskDetails comprising a data field configured to indicate whether or not identity information of the non-target communicating entity is to be obfuscated, the data field comprising an indication that identity information of the non-target communicating entity is to be obfuscated. The POI transmits, to a MDF2 via an LI_X2 interface, event data comprising information pertaining to LI of the target communicating entity and comprising obfuscated identity information of the non-target communicating entity. The MDF2 then transmits, to a LEMF via an LI_HI2 interface, a report that comprises information pertaining to LI of the target communicating entity and in which report the identity information of the non-target communicating entity is obfuscated.

In some of these embodiments, the transmission of the event data comprises omitting at least part of the identity information of the non-target communicating entity. Moreover, in some embodiments, the POI performs hashing of at least part of the identity information of the non-target communicating entity, and then the transmission of the event data comprises transmitting the hashed identity information of the non-target communicating entity.

In a further aspect there is provided a computer system comprising a plurality (i.e. at least two) of server blades, each server blade comprising a processor and a memory. The memory contains instructions executable by the processor whereby the computer system is operative to perform a method as summarized above in connection with the first aspect.

In yet a further aspect there are provided a computer program comprising instructions which, when executed on at least one processor cause a processor to carry out a method according to any of the aspects as summarized above. In yet a further aspect there is provided a carrier comprising such a computer program, wherein the carrier is one of an electronic signal, an optical signal, a radio signal and a computer readable storage medium.

These further aspects and embodiments of these further aspects provide the same effects and advantages as summarized above in connection with the method of the first aspect.

DETAILED DESCRIPTION

Figure 1A:
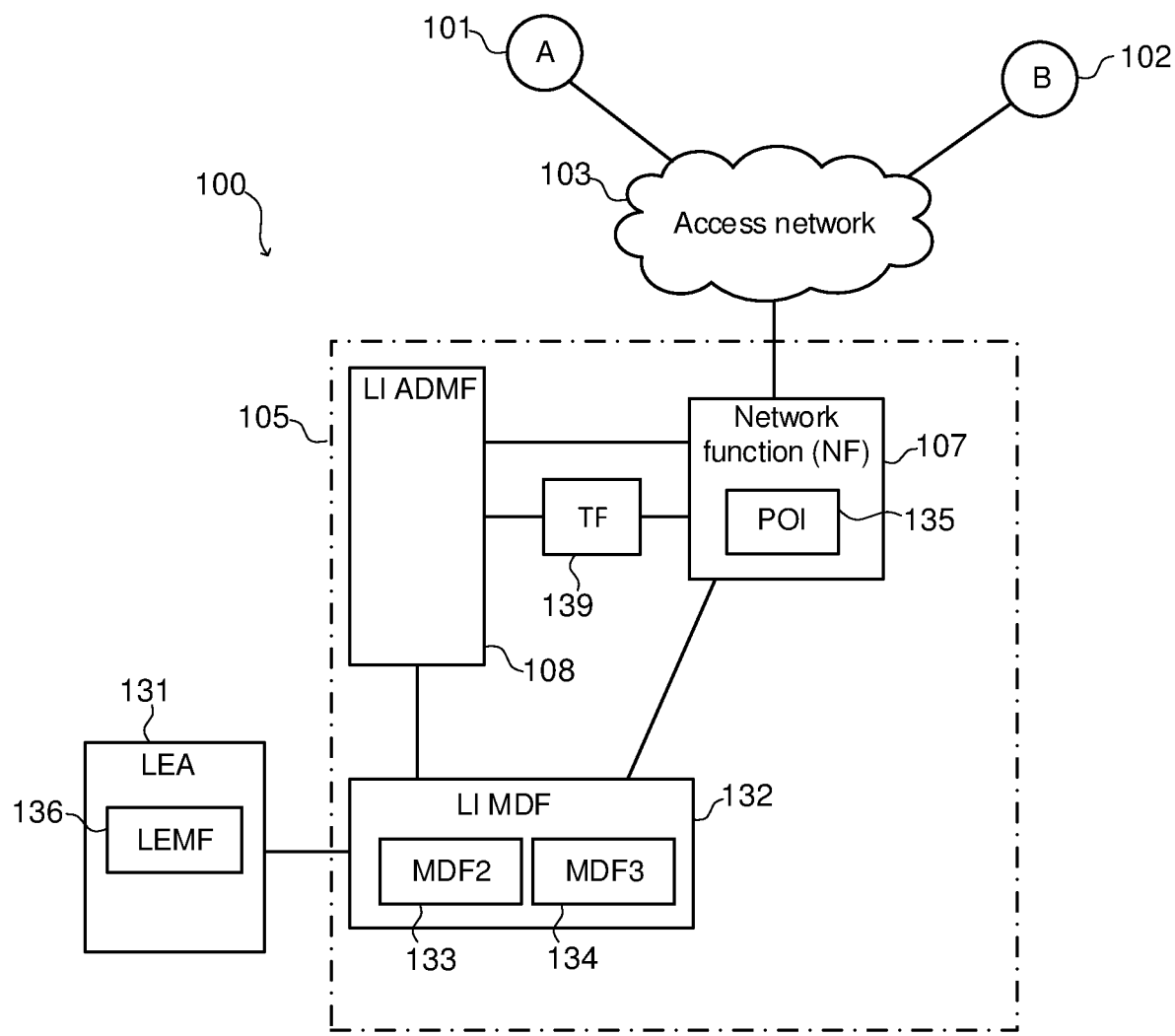
FIGS. 1a-c are schematically illustrated block diagrams of LI systems.

FIG. 1a schematically illustrates a first functional representation of a telecommunication network 100 comprising a core network 105 and an access network 103 in which two communicating entities, a target communicating entity 101 and a non-target communicating entity 102 are connected. The access network may, e.g., be in the form of a 3GPP radio access network (RAN) or any other type of non-3GPP communication network that may connect to the core network 105.

As the skilled person will realize, communication performed by the target and non-target communicating entities 101, 102 is enabled by several functional units in both the access network 103 and the core network 105. For the sake of clarity of description, such functional units are not illustrated in full but only schematically represented and exemplified by a network function 107 that, in a 4G context, may be a mobility management entity (MME), a serving gateway (S-GW), a packet data network gateway (P-GW) etc. In a 5G context, the network function may, e.g., be in the form of a policy control function (PCF), a user data management function (UDM), an Access and Mobility Management Function (AMF) or a session management function (SMF) etc. The network function may even be an SMS-Function (SMSF). A common characteristic of such functional units, as represented by network function 107, in the core network 105 is that they may comprise LI functionality in the form of a point of interception (POI) 135. The POI 135 is in FIG. 1a thus depicted as being a part of the network function 107 or being embedded therein, but the POI 135 may also be separate from the network function 107 with which it is associated. The core network 105 may be the core network of a serving network (SN), which may be a Visited Public Land Mobile Network (VPLMN) or a Home Public Land Mobile Network (HPLMN).

The core network 105 also comprises an administrative function (ADMF) 108 and a mediation and delivery function (MDF) 132 that connects to a LEA 131. Within the MDF 132 a MDF2 133 and a MDF3 134 function are configured to handle an Intercept Product in the form of intercept related information (IRI) and content of communication (CC) received from the POI 135, respectively, and provide the IRI and CC to the LEA 131. The LEA 131 manages a law enforcement monitoring facility (LEMF) 136, which receives IRI from the MDF2 133 and CC from the MDF3 134. A triggering function (TF) 139 is responsible for triggering triggered POIs in response to network and service events matching criteria provisioned by the ADMF 108. The TF 139 detects targeted communications and sends a trigger to the associated triggered POI, e.g. the POI 135.

Figure 1B:
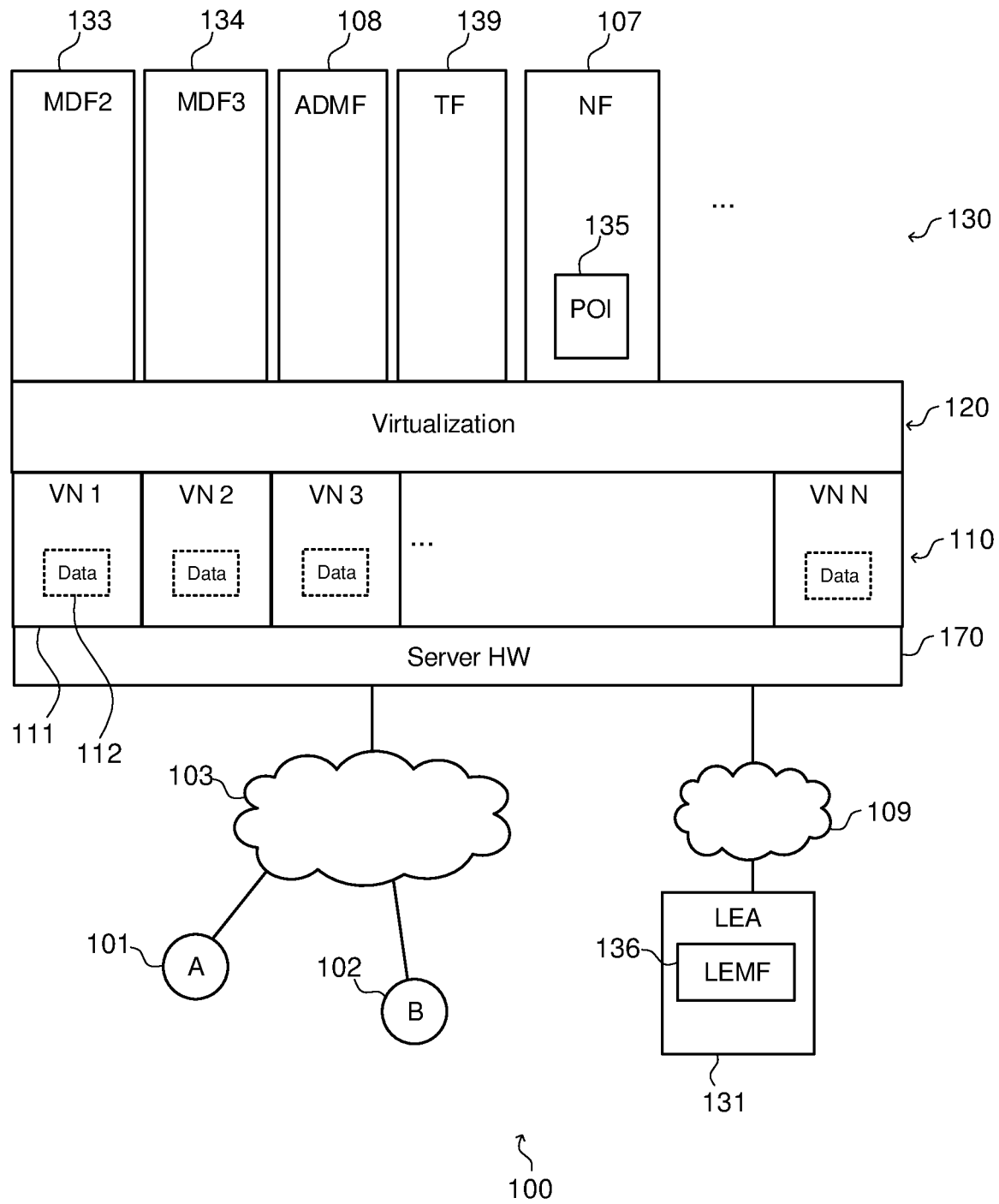

FIG. 1*b* schematically illustrates a second functional representation of the telecommunication network 100. In this second functional representation, the telecommunication network 100 is realized at least in part by virtualized functions that are executed on virtual nodes 110 that utilize a hardware server platform 170. The MDF2 133, the MDF3 134, the ADMF 108, the TF 139, the NF 107 and the POI 135 are realized in a functional layer 130 of virtualized network functions (VNF) that execute in the virtual nodes 110 via a virtualization layer 120. The LEA 131 with its LEMF 136 is connected to the hardware platform 170 via an intermediate network 109, the details of which are outside the scope of the present disclosure.

The ADMF 108, the MDF2 133, the MDF3 134, the POI 135 and the TF 139 as well as the LEMF 136 may all be embodied as software installed in one or more network devices, which all comprise processing and storage resources that are configured to realize and handle LI information as will be exemplified in detail below.

Figure 1C:
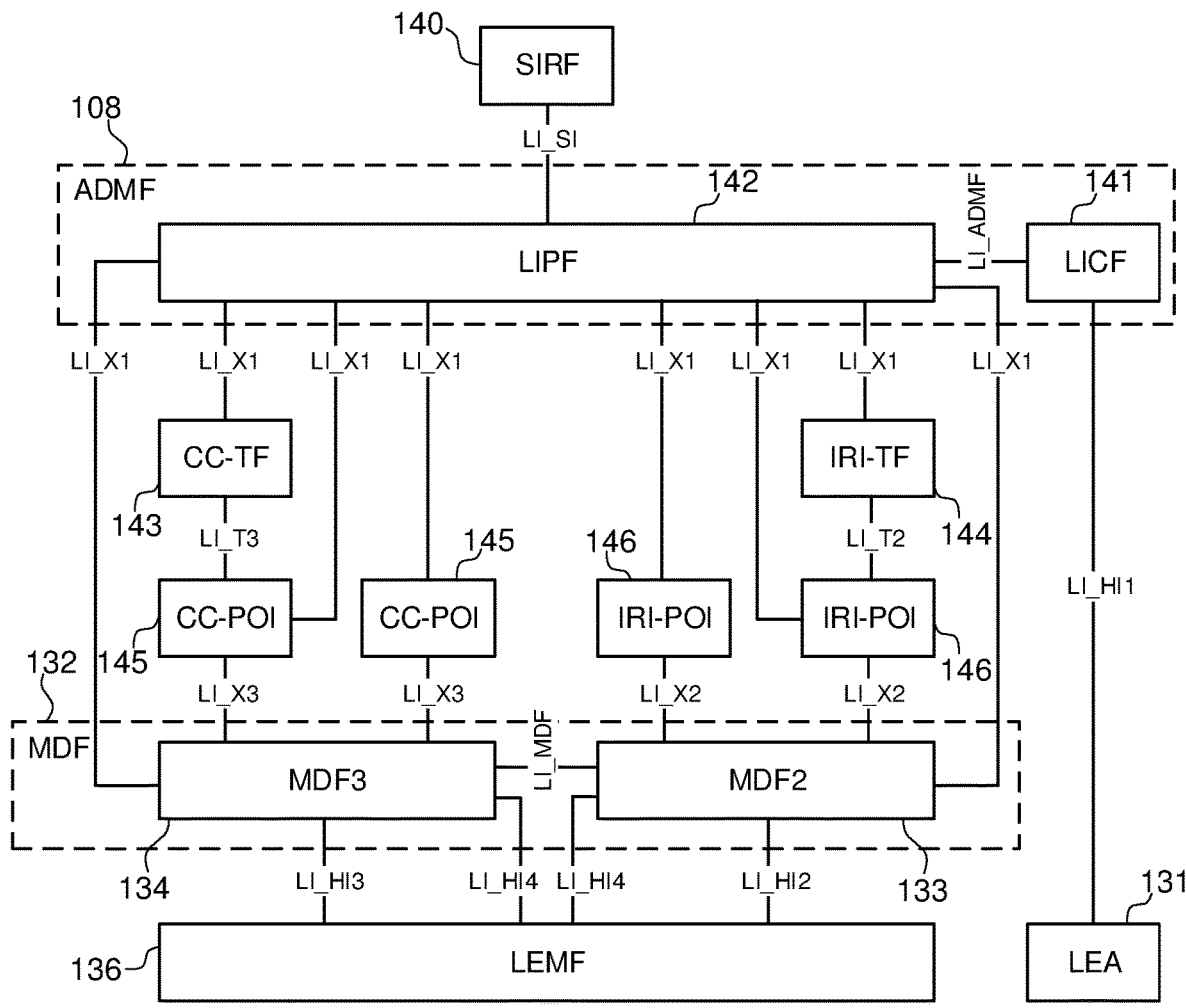

FIG. 1*c* illustrates in some more detail LI functionality that may be involved in handling LI information in a 5G scenario as described herein. Specifically, FIG. 1*c* illustrates functional entities and interfaces between functional entities as defined by relevant standard specifications as will be discussed below.

Law Enforcement Agency (LEA) 131:

In general, the LEA 131 is responsible for submitting a warrant for lawful interception to a communications service provider (CSP) whose network is the home network of a subscriber associated with the targeted communicating entity, although in some countries the warrant may be provided by a different legal entity (e.g. judiciary).

Point of Interception (POI) 145, 146:

A CC-POI 145 and an LI-POI 146 (which may correspond to the POI 135 exemplified herein) detect the target communication, derives the intercept related information (IRI) or communications content (CC) from the target communications and delivers the POI output as xIRI (LI_X2 Intercept Related Information) to the MDF2 133 or as xCC (LI_X3 Communications Content) to the MDF3 134. The output of a POI is determined by the type of the network function (cf. above) associated with the CC-POI 145 and the IRI-POI 146. As discussed above, the CC-POI 145 and the IRI-POI 146 may be embedded within a network function (NF) or separate from a NF with which it is associated. Multiple POIs may have to be involved in executing a warrant.

Triggering Function (TF) 143, 144:

A CC-TF 143 and an IRI-TF 144 are provisioned by a LI provisioning function (LIPF) 142 (which will be described in further detail below) and are responsible for triggering triggered CC-POI 145 and IRI-POI 146, respectively, in response to network and service events matching the criteria provisioned by the LIPF 142. The CC-TF 143 and IRI-TF 144 detect the target communications and send a trigger to the associated triggered CC-POI 145 and IRI-POI 146.

As a part of this triggering, the CC-TF 143 and IRI-TF 144 sends all necessary interception rules (i.e. rules that allow the CC-POI 145 and the IRI-POI 146 to detect the target communications), forwarding rules (i.e. addresses of an MDF2 133 and an MDF3 134), target communicating entity 101, and the correlation information.

A TF may interact with other POIs to obtain correlation information. Details of this interface are outside the scope of the present disclosure.

Mediation and Delivery Function (MDF) 132:

The MDF 132 delivers the Interception Product to a LEMF 136. Two variations of MDF 132 are defined: MDF2 133 and MDF3 134.

The MDF2 133 generates the IRI messages from the xIRI and sends them to one or more LEMFs, e.g. the LEMF 136. The MDF3 134 generates the CC from the xCC and delivers it to one or more intercepting LEMFs, e.g. the LEMF 136.

The MDF2 133 and MDF3 134 are provisioned by the LIPF 142 with the intercept information necessary to deliver the IRI and/or CC to one or more LEMFs, e.g. the LEMF 136. As will be described in more detail below, an LI_MDF interface between MDF2 133 and MDF3 134 allows the MDF2 133 and MDF3 134 to exchange information between the two.

Administrative Function (ADMF) 108:

The ADMF 108, which is responsible for the overall management of the LI functionality, includes the two logical functions: a LI control function (LICF) 141 and a LI provisioning function (LIPF) 142. Within one ADMF 108 there is one LICF 141, and at least one, but possibly multiple LIPFs 142. Although not illustrated in FIG. 1*c*, the ADMF 108 also contains the issuing certificate authority (CA) for all LI components (POIs, MDFs etc.).

The LICF 141 controls the management of the end-to-end life cycle of a warrant. The LICF 141 contains a master record of all sensitive information and LI configuration data. The LICF 141 is ultimately responsible for all decisions within the overall LI system. The LICF 141, via the LIPF 142 acting as its proxy, is responsible for auditing other LI components (POIs, MDFs etc.). The LICF 141 is responsible for communication with the LEA 131.

The LICF 141 provides intercept information derived from the warrant for provisioning at the CC-POI 145 and IRI-POI 146, CC-TF 143 and IRI-TF 144, MDF2 133 and MDF3 134.

Except for the communication with the LEA 131, all other communication between the LICF 141 and any other entities is proxied by the LIPF 142.

The LICF 141 also maintains and authorizes a master list of POIs, TFs and MDFs. In dynamic networks the LIPF 142 is responsible for providing the LICF 141 with any necessary updates to such a POI/TF and MDF master list.

The LIPF 142 provisions all the applicable POIs, TFs and MDFs, e.g. the CC-POI 145 and IRI-POI 146, CC-TF 143 and IRI-TF 144, MDF2 133 and MDF3 134. The role of the LIPF 142 varies depending on implementation of network functions and of the ADMF 108 itself (e.g. virtual or non-virtual). In its simplest form, the LIPF 142 is the secure proxy used by the LICF 141 to communicate with POIs, TFs, MDFs, e.g. the CC-POI 145 and IRI-POI 146, CC-TF 143 and IRI-TF 144, MDF2 133 and MDF3 134 or other infrastructure required to operate LI within the telecommunication network 100. In this scenario the LIPF 142 does not store target information and simply routes LI_X1 messages from and to the LICF 141.

In scenarios where the ADMF 108 is required to take an active role in POI triggering, the LIPF 142 is responsible for receiving triggering information (e.g. from an IRI-TF) and forwarding the trigger to the appropriate POI.

For directly provisioned POIs, TFs and MDFs, e.g. the CC-POI 145 and IRI-POI 146, CC-TF 143 and IRI-TF 144, MDF2 133 and MDF3 134, the LIPF 142 will forward all LI administration instructions from the LICF 141 to the intended destination POI, TF or MDF, e.g. the CC-POI 145 and IRI-POI 146, CC-TF 143 and IRI-TF 144, MDF2 133 and MDF3 134.

In a service based architecture (SBA), as defined in 3GPP technical specification (TS) TS 23.501 V15.7.0, or virtualized deployments, the LIPF 142 is responsible for identifying changes to NFs, POIs, and TFs and MDFs through interaction with the SIRF 140 or underlying virtualization infrastructure. The LIPF 142 shall notify the LICF 141 of changes affecting the number of active NFs/POIs and TFs or other information which the LICF 141 requires to maintain the master POI/TF and MDF list.

While the LIPF 142 is assumed to be stateful with respect to dynamic interceptions it is managing, it shall not hold the full static target or other historic LI data. If the LIPF 142 is deployed in a virtualized environment, the LIPF 142 shall not store LI information in persistent storage and shall rely on the LICF 141 to manage re-synchronization in the case of LIPF 142 restart.

System Information Retrieval Function (SIRF) 140:

The SIRF 140 is responsible for providing the LIPF 142 with the system related information for NFs that are known by the SIRF 140 (e.g. service topology). The information provided shall allow the LIPF 142 and LICF 141 to perform the necessary operations to establish and maintain interception of the target service (e.g. provisioning POIs, TFs and MDFs, e.g. the CC-POI 145 and IRI-POI 146, CC-TF 143 and IRI-TF 144, MDF2 133 and MDF3 134 over the LI_X1 interface as will be discussed below). LIPF/LICF 142, 141 knowledge of the existence of POI, TF and MDF, e.g. the CC-POI 145 and IRI-POI 146, CC-TF 143 and IRI-TF 144, MDF2 133 and MDF3 134, is provided directly by interactions between the LIPF/LICF 142, 141 and the underlying telecommunication network provider's management systems that instantiate NFs.

While the LIPF 142 is responsible for interactions with the SIRF 140, the LIPF 142 will forward applicable information to the LICF 141.

Law Enforcement Monitoring Facility (LEMF) 136:

The LEMF 136 receives the interception product (i.e. information pertaining to performed LI) from the MDF2 133 and from the MDF3 134. However, a detailed description of the LEMF 136 is outside of scope of the present disclosure.

Interface LI_SI

Lawful interception system information interface (LI_SI) is an interface between the SIRF 140 and the LIPF 142. The SIRF 140 uses this interface to provide the system information to the LIPF 142. The LIPF 142 may request the SIRF 140 for such information before sending the intercept provisioning information to the CC-POI 145 and IRI-POI 146. The SIRF 140 may also notify the LIPF 142 whenever the status of a system function changes (e.g. removed from service, migrating to another location, etc.).

Interface LI_HI1

Lawful interception handover interface (LI_HI1) is used to send warrants and other interception request information from the LEA 131 to the CSP that provides the telecommunication network 100. This interface may be electronic or may be an offline manual process depending on national warranty processes.

The following are some of the information elements sent over this interface:

Target identifier: Used to identify the communications to be intercepted.

Type of intercept: Used to indicate whether IRI only, CC only, or both IRI and CC, is to be delivered to the LEMF 136.

Service scope: Used to identify the service (e.g. voice, packet data, messaging, target positioning) to be intercepted.

Filtering criteria: Used to provide additional specificity for the interception (e.g. for bandwidth optimization).

LEMF address: Used to deliver the interception product.

Lawful interception identifier: Used to associate the interception product with the issued warrant.

Interface LI_X1 (Lawful Interception Internal Interface 1)

LI_X1 interfaces are used to manage the POIs, e.g. CC-POI 145 and IRI-POI 146, and triggering functions, e.g. CC-TF 143 and IRI-TF 144, and to provision LI target information on the POIs and TFs to intercept target communications. LI_X1 interfaces are also used to manage and provision mediation and delivery functions, e.g. MDF2 133 and MDF3 134, with the necessary information to deliver those communications in the correct format to LEMFs, e.g. LEMF 136.

LI_X1 Between LIPF and POI

The following are examples of some of the information that may be passed over LI_X1 from the LIPF 142 to the POI, e.g. CC-POI 145 and IRI-POI 146, as a part of intercept provisioning:

Information necessary to associate multiple xIRI/xCC at MDF2/MDF3, e.g. MDF2 133, MDF3 134.

Target Identifier.

Type of intercept (IRI only; CC only; or IRI and CC).

Service scoping.

Further filtering criteria.

Address of MDF2 133 or MDF3 134.

The exact nature of the information passed depends on the role of the POI.

The LI_X1 interface between the LIPF 142 (in the ADMF 108) and a triggered POI, e.g. CC-POI 145 and IRI-POI 146, shall be used only for audit and management purposes, and not for provisioning purposes.

LI_X1 Between LIPF and TF

The following are examples of some of the information that may be passed over LI_X1 from the LIPF 142 to the TF, e.g. CC-TF 143 and IRI-TF 144, as a part of intercept provisioning:

Information necessary to associate multiple xIRI/xCC at MDF2/MDF3, e.g. MDF2 133, MDF3 134.

Target Identifier.

Type of Intercept (IRI only; CC only; or IRI and CC).

Service Scoping.

Further filtering criteria.

Address of MDF2 133 or MDF3 134.

The exact nature of the information passed depends on the role of the TF.

LI_X1 Between LIPF and MDF2/MDF3

The following are examples of some of the information that may be passed over LI_X1 from the LIPF 142 to the MDF2/MDF3, e.g. MDF2 133, MDF3 134, as a part of intercept provisioning:

Information necessary used to associate multiple xIRI/xCC at MDF2/MDF3, e.g. MDF2 133, MDF3 134.

Target Identifier.

Lawful Interception Identifier.

Type of Intercept (IRI only; CC only; or IRI and CC).

Service Scoping.
Further filtering criteria.
Address of LEMF 136.
The exact nature of the information passed depends on the role of the MDF.

Interface LI_X2 (Lawful Interception Internal Interface 2)

The LI_X2 interfaces are used to pass LI_X2 intercept related information (xIRI) from IRI-iPOIs, e.g. POI 146, to the MDF2 133.

The following are some of the information passed over the LI_X2 interface to the MDF2 133 as a part of xIRI:
Target Identifier.
Time stamp.
Correlation Number.
Intercept Related Information (IRI) event resulting in xIRI.

It is to be noted however that fully standardised definition of LI_X2 interface is outside the scope of the present disclosure.

Interface LI_X3 (Lawful Interception Internal Interface 3)

LI_X3 interfaces are used to pass real-time content of communications (i.e. xCC) and associated metadata from CC-POIs, e.g. POI 145, to MDF3 134. The following are some of the information passed over this interface to the MDF3 134 as a part of xCC:
Target Identifier.
Time stamp.
Correlation Number.
User plane packets.

It is to be noted however that fully standardised definition of LI_X3 interface is outside the scope of the present disclosure.

Interface LI_T

The LI_T interface is used to pass the triggering information from the triggering function, e.g. CC-TF 143 and IRI-TF 144 to the POI, e.g. CC-POI 145 and IRI-POI 146. Depending on the POI type, two types of LI_T are defined: LI_T2 and LI_T3. LI_T2 is used when POI Output is sent over LI_X2 and LI_T3 is used when POI Output is sent over LI_X3.

Interface LI_T2

The LI_T2 interface is from IRI-TF 144 to IRI-POI 146. The following are some of the information passed over this interface to the IRI-POI:
Target Identifier.
IRI interception rules.
MDF2 address.
Correlation Information.

The IRI interception rules allow the IRI-POI 146 to detect the target communication information to be intercepted.

Interface LI_T3

LI_T3 interface is from CC-TF 143 to CC-POI 145. The following are some of the information passed over this interface to CC-POI:
Target Identifier.
CC interception rules.
MDF3 address.
Correlation Information.

The CC interception rules allow the CC-POI 145 to detect the target communication information to be intercepted.

Interface LI_HI2 (LI_Handover Interface 2)

LI_HI2 is used to send IRI from the MDF2 133 to the LEMF 136. This interface is defined in 3GPP TS 33.128 V15.2.0.

Interface LI_HI3 (LI_Handover Interface 3)

LI_HI3 is used to send CC from the MDF3 134 to the LEMF 136. This interface is defined in 3GPP TS 33.128 V15.2.0.

Interface LI_HI4 (LI_Handover Interface 4)

LI_HI4 is used by the MDF2 133 and MDF3 134 to report to the LEMF 136 that the MDF2 133 and MDF3 134 have been provisioned as expected. This capability is mandatory to support but optional to use (subject to relevant national agreement) at both MDF2 133 and MDF3 134.

LI Operation Notification

The MDF2 133 and MDF3 134 shall support reporting to the LEMF 136 changes to provisioning, including:
Activation of LI.
Modification of active LI.
Deactivation of LI.

it is to be noted that the mechanism may be needed at the CSP to prevent duplicate notifications being raised in the case of LI being provisioned across multiple MDFs.

Contents of the Notification
Each notification shall include at least the following:
The type of notification (e.g. activation, deactivation).
Relevant related information (LIID, time of change).

Interface LI_ADMF

LI_ADMF is an interface between LICF 141 and LIPF 142 and is used by the LICF 141 to send the intercept provisioning information to the LIPF 142.

Interface LI_MDF

LI_MDF is an interface between MDF2 133 and MDF3 134 and is used for MDF2 133 and MDF3 134 to interact with each other in the generation of IRI and CC.

Turning now to FIGS. 2*a-c* and FIG. 3, and with continued reference to FIGS. 1*a-c*, embodiments of methods related to managing LI information in a telecommunication network 100 will be described in detail. The embodiments will exemplify how the various functional units and interfaces described above may be enhanced in order to provide the advantages of protected privacy in the context of LI as summarized above.

Figure 2A:
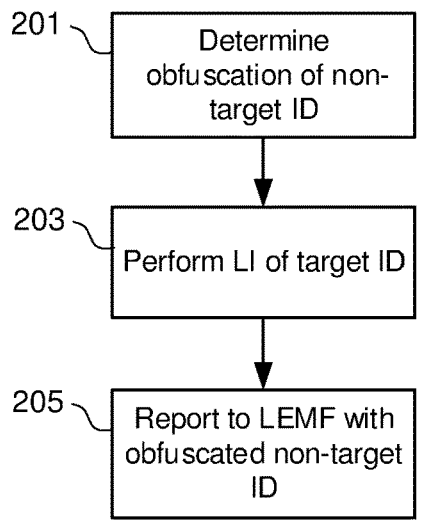
FIGS. 2a-c are flowcharts of methods.

FIG. 2*a* illustrates a method that comprises actions performed in the telecommunication network 100 introduced and described above in connection with FIGS. 1*a-c*:

Action 201

A determination is made that an identity of a non-target communicating entity 102, with which a target communicating entity 101 is communicating, is to be obfuscated in any report of LI of the target communicating entity 101 to the LEA 131.

Examples of identities of the target communicating entity 101 and the non-target communicating entity 102 are presented below in table 3.

The determination in action 201 that an identity of the non-target communicating entity 102 is to be obfuscated may comprise determining that the identity of the non-target communicating entity 102 is to be obfuscated only in reports of intercept related information, IRI.

Action 203

LI is then performed of the target communicating entity 101.

Action 205

Information pertaining to the performed LI of the target communicating entity 101 is reported to the LEA 131. The reported information comprises non-obfuscated identity information of the target communicating entity 101 and obfuscated identity information of the non-target communicating entity 102.

Figure 2B:
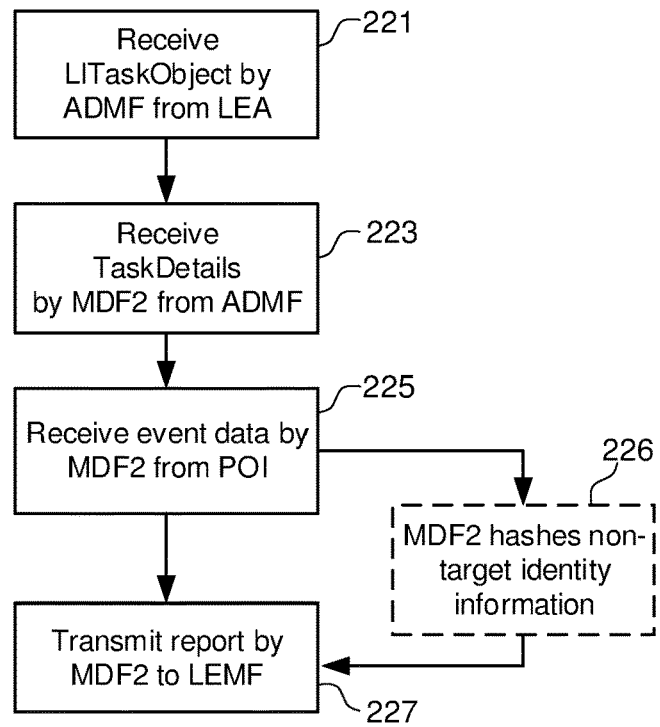

FIG. 2b illustrates in some more detail a method performed in the network 100:

Action 221

The ADMF 108 receives, from the LEA 131 via an LI_HI1 interface, a LITaskObject comprising a data field configured to indicate whether or not identity information of the non-target communicating entity 102 is to be obfuscated in a report of LI of the target communicating entity 101 to the LEA 131. This data field comprises an indication that identity information of the non-target communicating entity 102 is to be obfuscated and the LITaskObject comprises a DeliveryType data field that indicates that only IRI is to be subject of LI.

Action 223

The MDF2 133 receives from the ADMF 108 via an LI_X1 interface, TaskDetails comprising a data field configured to indicate whether or not identity information of the non-target communicating entity 102 is to be obfuscated. The data field comprises an indication that identity information of the non-target communicating entity 102 is to be obfuscated.

Action 225

The MDF2 133 receives, from a POI 135 via an LI_X2 interface, event data comprising information pertaining to the performed LI of the target communicating entity 101.

Action 227

The MDF2 133 transmits, to the LEMF 136 via an LI_HI2 interface, a report that comprises information pertaining to LI of the target communicating identity 101 and in which report the identity information of the non-target communicating entity 102 is obfuscated.

The transmission in action 227 of the report may comprise omitting at least part of the identity information of the non-target communicating entity 102, and thereby obfuscating the identity information of the non-target communicating entity 102.

As illustrated by action 226, the MDF2 133 may also or alternatively perform hashing of at least part of the identity information of the non-target communicating entity 102. The transmission in action 227 of the report then comprises transmitting the hashed identity information of the non-target communicating entity 102, and thereby obfuscating the identity information of the non-target communicating entity 102.

Figure 2C:
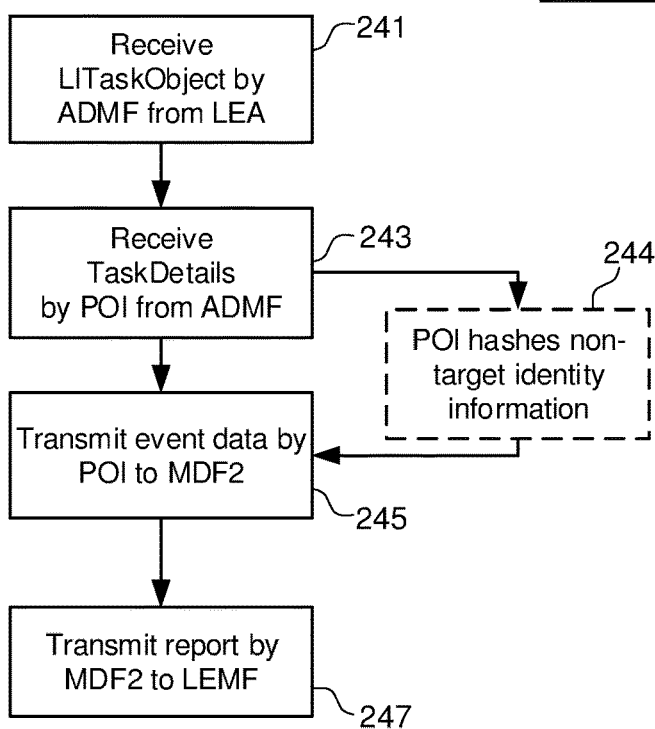

FIG. 2c illustrates in some more detail a method performed in the network 100:

Action 241

The ADMF 108 receives, from the LEA 131 via an LI_HI1 interface, a LITaskObject comprising a data field configured to indicate whether or not identity information of the non-target communicating entity 102 is to be obfuscated in a report of LI of the target communicating entity 101 to the LEA 131. This data field comprises an indication that identity information of the non-target communicating entity 102 is to be obfuscated, and the LITaskObject comprises a DeliveryType data field that indicates that only IRI is to be subject of LI.

Action 243

The POI 135 receives, from the ADMF 108 via an LI_X1 interface, TaskDetails comprising a data field configured to indicate whether or not identity information of the non-target communicating entity 102 is to be obfuscated. This data field comprises an indication that identity information of the non-target communicating entity 102 is to be obfuscated.

Action 245

The POI 135 transmits, to the MDF2 133 via an LI_X2 interface, event data comprising information pertaining to LI of the target communicating entity 101 and comprising obfuscated identity information of the non-target communicating entity 102.

The transmission in action 245 of the event data may comprise omitting at least part of the identity information of the non-target communicating entity 102, and thereby obfuscating the identity information of the non-target communicating entity 102.

As illustrated by action 244, the POI 135 may also or alternatively perform hashing of at least part of the identity information of the non-target communicating entity 102. The transmission in action 245 of the event data then comprises transmitting the hashed identity information of the non-target communicating entity 102, and thereby obfuscating the identity information of the non-target communicating entity 102.

Action 247

The MDF2 133 transmits, to the LEMF 136 via an LI_HI2 interface, a report that comprises information pertaining to LI of the target communicating entity 101 and in which report the identity information of the non-target communicating entity 102 is obfuscated.

Figure 3:
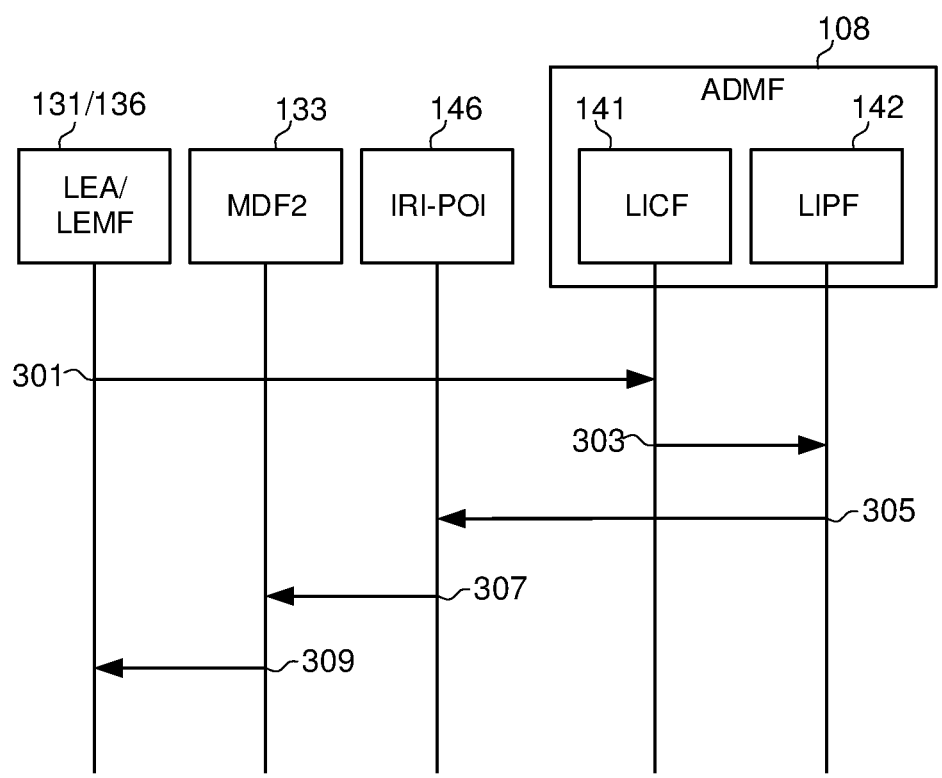
FIG. 3 is a signaling diagram illustrating a method,
FIG. 4 schematically illustrates a computer system, and
FIG. 5 schematically illustrates a computer system.

Turning now to FIG. 3, a sequence of actions and signalling will be described in some more detail.

When the LEA 131 (e.g. a user operating at the LEA 131) creates a warrant containing a LITaskObject (by LI_HI1) with DeliveyType=Only IRI and associates it to the LEMF 136 created with one specific LI_HI2 interface, a Non-Target Obfuscation field is enabled, thereby enabling the "add-on functionality" of obfuscation as described herein.

The LITaskObject includes, among others, the following fields:

TABLE 1

| Field | Description |
| --- | --- |
| Reference | Lawful Interception Identifier (LIID) assigned to the product of task. |
| TargetIdentifier | The communication address or technical identifier used to identify the target of task. Details about TargetIdentifier can be found in European telecommunications standards institute (ETSI) TS 103 120 V1.3.1 (Clause 8.2.6 and Annex C) |
| DeliveryType | It indicates whether the interception should contain IRI, CC or both |
| CSPID | Describes the CSP required to implement the Task |
| . . . | . . . |
| Non-Target Obfuscation | enabled |

The LICF 141 in the ADMF 108 receives the warrant containing the LITaskObject from the LEA 131, illustrated in FIG. 3 by signal 301. The LICF 141 then derives the intercept information from the warrant and provides it to the LIPF 142 in the ADMF 108, illustrated in FIG. 3 by signal 303.

The LIPF 142 then provisions, as illustrated by signal 305, the IRI-POI 146, via the LI_X1 interface, with Task Details including among other fields the new Non-Target Obfuscation field enabled:

TABLE 2

| Field | Description |
|---|---|
| XID | LIID assigned to the product of task.<br>Uniquely identifies the Task.<br>There may be more than one different Task relating to the same target identifier (two distinct XIDs). The X1 interface supports delivery of this situation (i.e. it is not considered an error on the X1 interface). |
| TargetIdentifiers | List of criteria which are used to identify the traffic to be intercepted.<br>Where multiple criteria are present, all criteria are required to be matched. If a network element (NE) cannot target based on the criteria specified (e.g. due to an unsupported format or inappropriate combination of identifiers) the NE shall reject the request with an appropriate error.<br>It is an implementation decision which identifiers and combinations of identifiers are supported. |
| DeliveryType | Enumerated value - one of "X2Only", "X3Only" and "X2andX3". |
| ListOfDIDs | List of Destination Identifiers (DID) referencing the desired delivery destination records. |
| ... | ... |
| Non-Target Obfuscation | Enabled.<br>Applicable for DeliveryType = "X2Only" |

The IRI-POI 146 performs interception, as is known to the skilled person, and prepares interception event data for provision to the MDF2 133. During this preparation of event data, in a first scenario, the IRI-POI 146 performs hashing of at least part of the identity information of the non-target communicating entity 102. In a second scenario, the identity information of the non-target communicating entity 102 remains un-hashed in the event data that is provided to the MDF2 133.

When an event is received by the MDF2 133 from IRI-POI 146, as illustrated by signal 307, in case of DeliveyType="X2Only", and Non-Target-Obfuscation enabled, then the MDF2 133 will provide, as part of a report illustrated by signal 309, the hash value of the identity of the other party of the communication, not under interception (i.e. the non-target communicating entity 102), to the LEMF 136. In the first scenario, the hash value of the identity of the non-target communicating entity 102 is already available as it has been created by the IRI-POI 146. In the second scenario, the MDF2 133 itself performs hashing of at least part of the identity information of the non-target communicating entity 102 and provides it to the LEMF 136 via signal 309.

As discussed above, having received the event data from the MDF2 133, the LEMF 136 won't be able to discover information covered by privacy. However, the LEMF 136 will be able to perform some statistical analysis using the hash value, e.g. that a given monitored target communicating entity contacts always the same persons.

Some examples of information to Obfuscate are reported in the following table (i.e. table 3 exemplifies identities of the target communicating entity 101 and non-target communicating entity 102):

TABLE 3

| Event | Target | Information to obfuscate |
|---|---|---|
| E-mail send | E-mail sender | E-mail address of the destination |
| E-mail receive | E-mail address of the destination | E-mail sender |
| Originating call | Calling party subscription permanent identifier (SUPI) | Called party SUPI |

TABLE 3-continued

| Event | Target | Information to obfuscate |
|---|---|---|
| | Calling party permanent equipment identifier (PEI) in international mobile equipment identity (IMEI) format | Called party PEI |
| | Calling party session initiation protocol uniform resource identifier (SIP-URI) | Called party SIP-URI |
| | Calling party telephone (TEL)-URI | Called party TEL-URI |
| | ... | ... |
| Terminating Call | Called party SUPI<br>Called party PEI<br>Called party SIP-URI<br>Called party TEL-URI<br>... | Calling party SUPI<br>Calling party PEI<br>Calling party SIP-URI<br>Calling party TEL-URI<br>... |
| ... | ... | ... |

The MDF2 133 supports reporting, illustrated as signal 309, to the LEMF 136 any changes, including changes of the hash value of the other party communication data not under interception (i.e. the non-target communicating entity 102). The MDF 132 (including the MDF2 133) converts the intercepted traffic into the required standard format and provides it (by modified LI-HI2) to a collection function running at the LEMF 136.

It is to be noted that hashing is a procedure of using an algorithm to map data of any size to a fixed length. This is called a hash value (or sometimes hash code or hash sums). Whereas encryption is a two-way function, hashing is a one-way function. While it's technically possible to reverse hash something, the computing power required makes it unfeasible. Hashing is one-way. As the skilled person will realize, the specific hashing algorithm used in action 226 and action 244 may be left to an implementor of the present disclosure. For example, any algorithms of the so-called secure hashing algorithm 2 (SHA-2) family or secure hashing algorithm 3 (SHA-3) family may be utilized in actions 226 and 244.

In the context of the present disclosure, hash values are useful in troubleshooting because they will be different for different non-target identities. This allows a troubleshooter to distinguish IRIs that are related to different communications from duplicated records (a situation that can happen in the field).

Moreover, hash values can provide useful statistics to the LEA 131 without revealing the identity of the non-target communicating entity 102. For example, the LEA 131 will know if the target communicating entity 101 calls the same number, a small group of numbers or many numbers. This can be important to the investigation.

If the same salt is used in calculating the hash value for two interceptions, the LEMF 136 can compare the hashes across interceptions. For example, this would allow the LEMF 136 to know that two different target communicating entities called the same number, albeit the LEMF 136 will not know what number. This is also rather important to establish connections between different investigations.

If the hashing algorithm and salt is disclosed (assuming the applicable regulation allows) it can be used to exclude some suspect (the hashing cannot be reversed but it is possible to hash a given telephone number and verify whether such a number was involved in previous calls). The same mechanism can be useful when a new target communicating entity 101 is added to an investigation. Then the LEMF 136 can calculate the hash of the new suspect and check whether it was involved in already intercepted calls.

Figure 4:
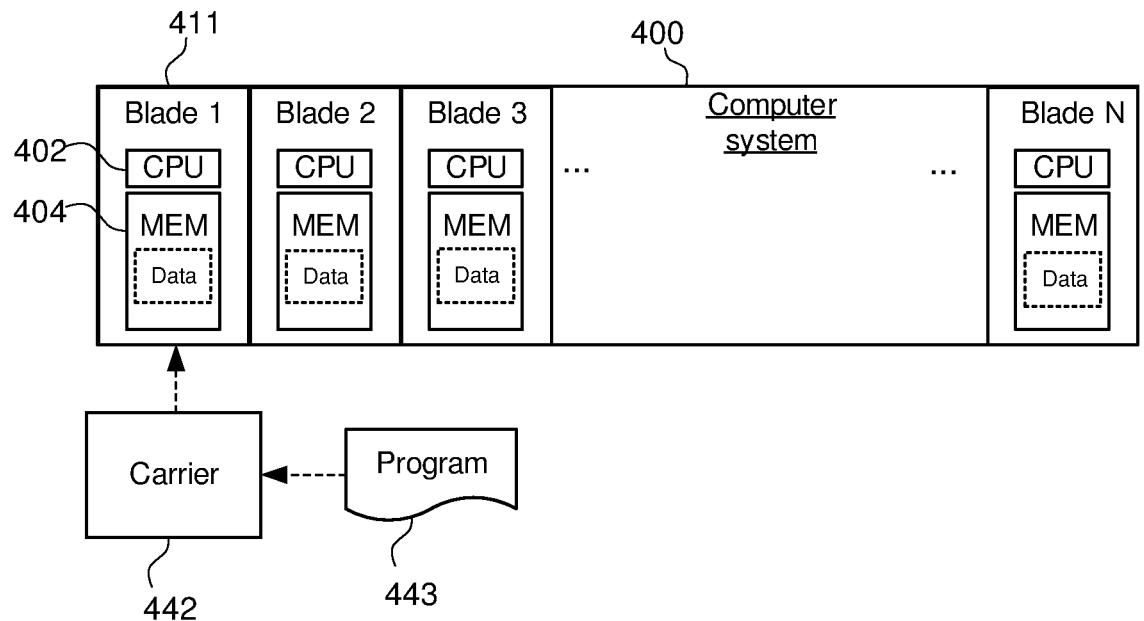

Turning now to FIG. 4, and with continued reference to FIGS. 1-3, a computer system 400 will be described in some detail. The computer system 400, which may correspond to at least part of the telecommunication network 100, comprises a plurality of server blades 411 that comprise a processor 402 and a memory 404. The memory 404 contains instructions executable by the processor 402 whereby the computer system 400 is operative to:
- determine that an identity of a non-target communicating entity, with which a target communicating entity is communicating, is to be obfuscated in a report of LI of the target communicating entity to a LEA,
- perform LI of the target communicating entity, and
- report information pertaining to the performed LI of the target communicating entity to the LEA, said reported information comprising non-obfuscated identity information of the target communicating entity and obfuscated identity information of the non-target communicating entity.

The instructions that are executable by the processor 402 may be software in the form of a computer program 441. The computer program 441 may be contained in or by a carrier 442, which may provide the computer program 441 to the memory 404 and processor 402. The carrier 442 may be in any suitable form including an electronic signal, an optical signal, a radio signal or a computer readable storage medium.

In some embodiments, the computer system 400 is operative such that the determination that an identity of the non-target communicating entity is to be obfuscated comprises determining that the identity of the non-target communicating entity is to be obfuscated only in reports of IRI.

In some embodiments, the computer system 400 is operative to:
- receive, by a LI ADMF from the LEA via an LI_HI1 interface, a LITaskObject comprising a data field configured to indicate whether or not identity information of the non-target communicating entity is to be obfuscated in a report of LI of the target communicating entity to the LEA, said data field comprising an indication that identity information of the non-target communicating entity is to be obfuscated, said LITaskObject comprising a DeliveryType data field that indicates that only IRI is to be subject of LI,
- receive, by a MDF2 from the ADMF via an LI_X1 interface, TaskDetails comprising a data field configured to indicate whether or not identity information of the non-target communicating entity is to be obfuscated, said data field comprising an indication that identity information of the non-target communicating entity is to be obfuscated,
- receive, by the MDF2 from a POI via an LI_X2 interface, event data comprising information pertaining to the performed LI of the target communicating entity, and
- transmit, by the MDF2 to a LEMF via an LI_HI2 interface, a report that comprises information pertaining to LI of the target communicating entity and in which report the identity information of the non-target communicating entity is obfuscated.

In some embodiments, the computer system 400 is operative such that the transmission of the report by the MDF2 comprises omitting at least part of the identity information of the non-target communicating entity.

In some embodiments, the computer system 400 is operative to:
- hash, by the MDF2, at least part of the identity information of the non-target communicating entity, and wherein the computer system 400 is operative such that the transmission of the report by the MDF2 comprises transmitting the hashed identity information of the non-target communicating entity.

In some embodiments, the computer system 400 is operative to:
- receive, by a LI ADMF from the LEA via an LI_HI1 interface, a LITaskObject comprising a data field configured to indicate whether or not identity information of the non-target communicating entity is to be obfuscated in a report of LI of the target communicating entity to the LEA, said data field comprising an indication that identity information of the non-target communicating entity is to be obfuscated, said LITaskObject comprising a DeliveryType data field that indicates that only IRI is to be subject of LI,
- receive, by a POI from the ADMF via an LI_X1 interface, TaskDetails comprising a data field configured to indicate whether or not identity information of the non-target communicating entity is to be obfuscated, said data field comprising an indication that identity information of the non-target communicating entity is to be obfuscated,
- transmit, by the POI to a MDF2 via an LI_X2 interface, event data comprising information pertaining to LI of the target communicating entity and comprising obfuscated identity information of the non-target communicating entity, and
- transmit, by the MDF2 to a LEMF via an LI_HI2 interface, a report that comprises information pertaining to LI of the target communicating entity and in which report the identity information of the non-target communicating entity is obfuscated.

In some embodiments, the computer system 400 is operative such that the transmission of the event data by the POI comprises omitting at least part of the identity information of the non-target communicating entity.

In some embodiments, the computer system 400 is operative to:
- hash, by the POI, at least part of the identity information of the non-target communicating entity, and wherein the computer system 400 is operative such that the transmission of the event data by the POI comprises transmitting the hashed identity information of the non-target communicating entity.

Figure 5:
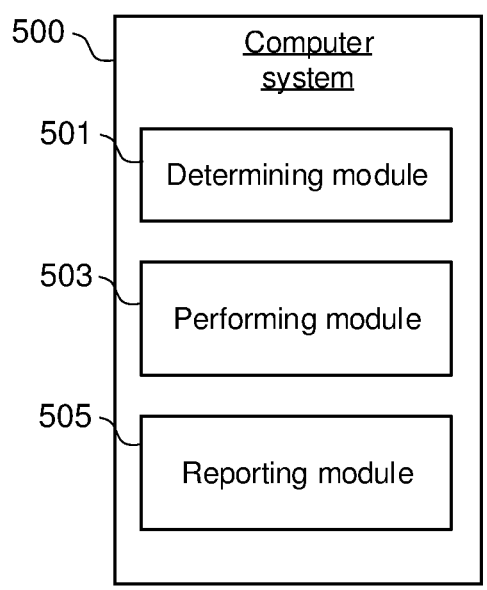

Turning now to FIG. 5, and with continued reference to FIGS. 1-4, a computer system 500 will be described in some detail. The computer system 500 comprises:
- a determining module 501, configured to determine that an identity of a non-target communicating entity, with which a target communicating entity is communicating, is to be obfuscated in a report of LI of the target communicating entity to a LEA,
- a performing module 503 configured to perform LI of the target communicating entity, and
- a reporting module 505 configured to report information pertaining to information pertaining to the performed LI of the target communicating entity to the LEA, said reported information comprising non-obfuscated identity information of the target communicating entity and obfuscated identity information of the non-target communicating entity.

The computer system 500 may comprise further modules that are configured to perform in a similar manner as, e.g., the computer system 400 described above in connection with FIG. 4.

The invention claimed is:

1. A method of managing lawful interception, LI, information in a telecommunication network, the method comprising:
    receiving, by an LI administrative function, ADMF via an LI HI1 interface from a Law Enforcement Agency, LEA, an object configured to indicate that identity information of a non-target communicating entity is to be obfuscated in a report of LI of a target communicating entity to the LEA,
    receiving, by a mediation and delivery function, MDF2, from the ADMF, TaskDetails, comprising a data field configured to indicate that the identity information of the non-target communicating entity is to be obfuscated based on the object,
    based on the data field received from the ADMF, determining that the identify information of the non-target communicating entity, with which the target communicating entity is communicating, is to be obfuscated in the report of LI of the target communicating entity to the LEA,
    performing LI of the target communicating entity, and
    reporting information pertaining to the performed LI of the target communicating entity to the LEA, said reported information comprising non-obfuscated identity information of the target communicating entity and obfuscated identity information of the non-target communicating entity.

2. The method of claim 1, wherein the determination that an identity of the non-target communicating entity is to be obfuscated comprises determining that the identity of the non-target communicating entity is to be obfuscated only in reports of intercept related information, IRI.

3. The method of claim 2,
    wherein:
    the object comprises a LITaskObject comprising a DeliveryType data field that indicates that only IRI is to be subject of LI, and
    wherein the method further comprises:
    receiving, by the MDF2 from a point of interception, POI, via an LI_X2 interface, event data comprising information pertaining to the performed LI of the target communicating entity, and
    transmitting, by the MDF2 to a law enforcement monitoring facility, LEMF, via an LI_HI2 interface, a report that comprises information pertaining to LI of the target communicating entity and in which report the identity information of the non-target communicating entity is obfuscated.

4. The method of claim 3, wherein the transmission of the report comprises omitting at least part of the identity information of the non-target communicating entity.

5. The method of claim 3, comprising:
    hashing, by the MDF2, at least part of the identity information of the non-target communicating entity, and wherein:
    the transmission of the report comprises transmitting the hashed identity information of the non-target communicating entity.

6. The method of claim 2, wherein:
    the object comprising the data field is received, by a LI administrative function, ADMF, via an LI_HI1 interface,
    the object comprises a LITaskObject, said LITaskObject comprising a Delivery Type data field that indicates that only IRI is to be subject of LI, and
    wherein the method further comprises:
    receiving, by a point of interception, POI, from the ADMF via an LI_X1 interface, TaskDetails comprising a data field configured to indicate whether or not identity information of the non-target communicating entity is to be obfuscated, said data field comprising an indication that identity information of the non-target communicating entity is to be obfuscated,
    transmitting, by the POI to a mediation and delivery function, MDF2, via an LI_X2 interface, event data comprising information pertaining to LI of the target communicating entity and comprising obfuscated identity information of the non-target communicating entity, and
    transmitting, by the MDF2 to a law enforcement monitoring facility, LEMF, via an LI_HI2 interface, a report that comprises information pertaining to LI of the target communicating entity and in which report the identity information of the non-target communicating entity is obfuscated.

7. The method of claim 6, wherein the transmission of the event data comprises omitting at least part of the identity information of the non-target communicating entity.

8. The method of claim 6, comprising:
    hashing, by the POI, at least part of the identity information of the non-target communicating entity, and wherein:
    the transmission of the event data comprises transmitting the hashed identity information of the non-target communicating entity.

9. A computer system comprising a plurality of server blades, each server blade comprising a processor and a memory, said memory containing instructions executable by said processor whereby said computer system is operative to:
    receive, by an LI administrative function, ADMF via an LI HI1 interface from a Law Enforcement Agency, LEA, an object indicating that identity information of a non-target communicating entity is to be obfuscated in a report of LI of a target communicating entity to the LEA,
    receive, by a mediation and delivery function, MDF2, from the ADMF, TaskDetails, comprising a data field configured to indicate that the identity information of the non-target communicating entity is to be obfuscated based on the object,
    based on the data field received from the ADMF, determine that the identity information of the non-target communicating entity, with which the target communicating entity is communicating, is to be obfuscated in the report of LI of the target communicating entity to the LEA,
    perform LI of the target communicating entity, and
    report information pertaining to the performed LI of the target communicating entity to the LEA, said reported information comprising non-obfuscated identity information of the target communicating entity and obfuscated identity information of the non-target communicating entity.

* * * * *